United States Patent [19]

Callut

[11] Patent Number: 4,865,740

[45] Date of Patent: Sep. 12, 1989

[54] METHOD AND APPARATUS FOR SEPARATING AND RECOVERING PARTICULATE MATERIAL

[75] Inventor: Francois J. Callut, Ham-Sur-Heure, Belgium

[73] Assignee: Ryan Investments, B.V., United Kingdom

[21] Appl. No.: 269,920

[22] Filed: Nov. 10, 1988

[30] Foreign Application Priority Data

Nov. 11, 1987 [GB] United Kingdom ............ 8726428

[51] Int. Cl.$^4$ .............................. B01D 17/038
[52] U.S. Cl. .................. 210/512.2; 209/144; 209/211
[58] Field of Search ............ 210/512.2, 512.1; 209/144, 211; 55/241

[56] References Cited

U.S. PATENT DOCUMENTS 4,023,942  5/1977  Brady .................... 55/241
4,394,138  7/1983  Schilling ............. 210/512.1

FOREIGN PATENT DOCUMENTS 903040  2/1985  Belgium .
718845  11/1954  United Kingdom .
726683  3/1955  United Kingdom .
927354  5/1963  United Kingdom .
2101504  1/1983  United Kingdom .

Primary Examiner—Frank Sever
Attorney, Agent, or Firm—Watts, Hoffmann, Fisher & Heinke

[57] ABSTRACT

Particulate material such as coal of a size inferior to 1 mm is recovered by being entrained in a liquid medium and being fed through an apparatus comprising a plurality of cyclone separators connected in series, the cyclone angle of the separators decreasing in the direction of flow. The cyclone angle $\alpha_2$ of a cyclone separator in the series is within ±5% of the angle calculated according to the formula $$\frac{\cot(90 - 2\alpha_1)}{\cot(90 - 2\alpha_2)} = \frac{\phi_1}{\phi_2}$$

wherein $\alpha_2$ is the cyclone angle of a cyclone separator following a separator with angle $\alpha_1$ and $\phi_1$ and $\phi_2$ represent the geometric means particle size of the cut of successive separators with these angles.

7 Claims, 5 Drawing Sheets

METHOD AND APPARATUS FOR SEPARATING AND RECOVERING PARTICULATE MATERIAL

TECHNICAL FIELD

This invention relates to improvements in the method of and apparatus for separating and recovering particulate material.

BACKGROUND ART

There are many applications where the separation and recovery of particulate material from bulk waste material and untreated run of the mine material (R.O.M.) would be economically and ecologically desirable. An example of this is the mounds, tips or slag heaps erected and being erected by the mining industry and composed of what was or is considered to be waste material produced in the winning of a mineral from the mine. Such tips, slag heaps or ponds contain quite large proportions of the mineral concerned but in a form which, at the time the reject reserve was being created, it was not considered viable to recover. Generally speaking, the mineral in the slag heaps and ponds is of particulate form and of such a small size that it was not thought possible to recover it economically.

DISCLOSURE OF THE INVENTION

The present invention provides a method of and apparatus for recovering and separating particulate material of the small sizes in question so that not only can the minerals concerned be recovered but the slag heaps and ponds can be demolished and re-distributed in the process to remove an unsightly presence from the landscape.

Of particular, but not exclusive, concern is the recovery of coal from slag heaps and ponds. The amount of coal present in such a reserve varies from area to area, but we have found that 20 to 100% of the coal present is of a particle size which is 1 mm or less. Coal of this size has not hitherto been believed to be recoverable commercially. We have now found that the major part of this coal, e.g., 70 to 100% by weight can be recovered using cyclone separators.

It is known to use cyclone separators for separating and recovering granular or particulate material. Such separators comprise an upper cylindrical portion having a coaxial tube (vortex finder) therein and a frusto-conical portion extending away from the cylindrical portion to the smaller diameter outlet or underflow. Material to be separated is mixed in a liquid medium to form a slurry and is introduced substantially tangentially into the cylindrical portion so that it spirals about the tube moving towards the underflow. After passing the inner end of the tube a proportion of the medium changes direction and flows upwardly through the tube to exit at the overflow, taking with it the particles of lesser density and size, the remainder exiting through the underflow.

The maximum density of the mineral to be recovered is generally known. In the case of coal the density is in the range of 1.5 to 2.5 and, more usually, about 1.8 to 2.0. It has hitherto been considered not possible or practical to recover by mechanical means only coal in this density range and having a particle size of 1 mm or less. Our research has shown that conventional cyclone separators operated in a conventional way do not separate coal particles of 1 mm or less in the density range of 1.8 to 2.0 from the waste material in which they are to be found. Our investigations have further revealed that the "cut" or characteristic of a cyclone separator can be modified by changing or selecting the cyclone angle. For present purposes, the cyclone angle is considered to be the angle a generatrix of the frusto conical part subtends to the axis in a common plane. By reducing this angle one can reduce the size of the particles which exit at the overflow having a given density or density range. If one assumes the cyclone angle to be $\alpha$ and the geometric mean of the particle sizes exiting at the overflow to be $\phi$, then the expression $$K_1 + K_2 \cdot \cot(90 - 2\alpha) = \phi \qquad 1$$

appears to hold true in the density range for coal. As $K_1$ is very small (close to 0), 1 can be written $$\cot(90 - 2\alpha) = K\phi \qquad 2$$

Thus, if one were looking to cut or separate coal particles in the range of 250 to 500 $\mu$, then $$\phi = \sqrt{250 \times 500} \ \mu \approx 350 \ \mu.$$

According to one aspect of the present invention there is provided a method of separating and recovering particulate material which comprises feeding the material entrained in a liquid medium through a plurality of cyclone separator stages connected in series by their overflows, the cyclone angle of the separators of the respective stages decreasing in the direction of flow. As each stage can be one or more similar separators connected in parallel, each stage will be simply referred to herein as a cyclone separator.

It will be appreciated that the bulk or size of a slag heap or tip or R.O.M. is such that the apparatus of the invention would generally be assembled on site and that samples would initially be taken of the raw material in the tip to ascertain density and particle size distribution. From this, the cyclone angle $\alpha_1$ of the first cyclone in the series can be arrived at given the estimated geometric mean particle $\phi_1$ for the first cut. One can then decide on the range of particle sizes for the cuts of successive separators. From equation 2 above it will be seen that $$\frac{\cot(90 - 2\alpha_1)}{\cot(90 - 2\alpha_2)} = \frac{\phi_1}{\phi_2} \qquad 3$$

Having decided initially on the values for $\alpha_1$, and $\phi_1$, and having selected $\phi_2$ for the second separator, it will be seen that the optimum cyclone angle $\alpha_2$ for the second separator can be calculated.

In the preferred method of the invention, the cyclone angle $\alpha_2$ of a cyclone separator in a series is $\pm 5\%$ of the angle calculated by the formula $$\frac{\cot(90 - 2\alpha_1)}{\cot(90 - 2\alpha_2)} = \frac{\phi_1}{\phi_2}$$

where $\alpha_2$ is the cyclone angle of a cyclone separator following a separator with angle $\alpha_1$ and $\phi_1$ and $\phi_2$ represent the geometric mean particle size of the cut of successive separators with these angles.

The liquid medium in which the particles are entrained is preferably water and it should be noted that the angle $\alpha$ controls the size range of washed or clean particulate material reporting to the overflow, $\phi$ being the geometric mean of this range.

It will be appreciated that for a given input velocity of the material, the larger and more dense particles report to the underflow and the smaller and lighter particles report to the overflow. The particulate material reporting to the overflow will therefore comprise a defined range of particle sizes of the mineral which are washed or clean and a balance of particles of smaller sizes which are not washed. By selecting the angle of the next succeeding cyclone separator, the washed particles within the range from the preceding cyclone separator report to and are recovered from the underflow and a further range of smaller particles which have been washed report to the overflow for recovery at the next succeeding cyclone separator.

If one assumes M to be the maximum size in microns of particles to be recover, m to be the minimum size in microns, R to be the ratio of the upper and lower limits of particle sizes in the range to be cut in each separator, then the number of stages required would be $$\frac{M}{m} = R^N$$

or $$N = \frac{\log\left(\frac{M}{m}\right)}{\log R} \qquad 4$$

For example, if the particulate material to be recovered is in the range of M=1000 $\mu$ and m=30 $\mu$ and R=2 then $$N = \frac{\log \frac{1000}{30}}{\log 2} = 5$$

Each of the 5 stages would provide a range of washed particles reporting to the overflow as follows,
Stage 1: 500–1000 $\mu$
Stage 2: 250–500 $\mu$
Stage 3: 125–250 $\mu$
Stage 4: 62–125 $\mu$
Stage 5: 31–62 $\mu$
If M=500 $\mu$, m=30 $\mu$ and R=2 then N=4 and this represents the number of stages in the example which follows.

If one assumes an arrangement with N stages and uses the suffix i to identify a stage intermediate stage 1 and stage N then $$\phi i = \frac{M}{\sqrt{R^i - 1 \cdot R^i}}$$

$\phi_i$ being the geometrical mean of the range of particle sizes cut by stage i.

The method of the invention may be regarded as separating and recovering particulate material by feeding the material entrained in a liquid medium to the first of a series of cyclone separators having a cyclone angle selected to cause clean and washed particles within a first defined range of particle sizes to report to the overflow together with particles of lesser size and feeding the material recovered from the overflow to a second cyclone separator having a cyclone angle less than that of the first separator and selected to encourage the cleaned and washed particles within the first defined range to report to the underflow for recovery and to cause cleaned and washed particles within a second defined range of particle sizes less than those of the first defined range to report to the overflow.

It will be appreciated that according to another aspect of the invention there is provided an apparatus for separating and recovering particulate material which comprises a plurality of cyclone separators connected in series with means for supplying the particulate material entrained in a liquid to the inlet of the first separator of the series and means for supplying the overflow from each separator to the inlet of the next separator, the cyclone angle of each cyclone in the series being less than that of its predecessor in the series.

With advantage, the cyclone angles of successive cyclone separators conform to the formula $$\frac{\cot(90 - 2\alpha_1)}{\cot(90 - 2\alpha_2)} = \frac{\phi_1}{\phi_2}$$

where $\alpha_1$, $\alpha_2$, $\phi_1$ and $\phi_2$ represent the parameters identified above in relation to equation 3.

It will be appreciated that for a given specific gravity (S.G.) the coarser particles report to the underflow of a separator and the finer particles to the overflow, although there will inevitably be some that report to the wrong exit. Our research has further identified that the diameter of the cyclone is a parameter which affects the efficiency of operation of a cyclone separator in relation to the particle sizes which report to the underflow or which exit through the overflow. By selecting this diameter it is possible to achieve a higher efficiency for the finer or smaller particles reporting to the overflow than for the larger particles reporter to the overflow. Thus, by selecting the cyclone angle, one can select a range of particle sizes to report to the overflow and, by selecting the cyclone diameter, one can reduce the chance of larger particle sizes reporting to the overflow and enhance the quantity reporting to the underflow.

With a plurality of cyclone separators in series, decreasing the diameter of the cyclones from one to the next has the effect of enhancing the quantity of coarser particles reporting to the underflow with respect to the quantity of coarser particles undesirably reporting to the overflow.

In its preferred form, the invention provides a method of separating and removing particles from waste material and unprocessed R.O.M. which comprises feeding the raw material suspended in water through a plurality of cyclone separators in series connected by their overflow in which both the cyclone angle and the diameter of the cyclones decrease from one separator to the next.

The invention also provides an apparatus for separating and removing particles from waste material and R.O.M. which comprises a plurality of cyclone separators arranged serially and having both a cyclone angle and a diameter smaller than the preceding cyclone separator in the series and means for feeding the waste material entrained in water to the first separator in the series.

It will be appreciated from the above discussion that the present invention provides a plurality of serially connected cyclone separators each of which has a cyclone angle selected to encourage coarser particles in a range of sizes to report to the underflow, which range is within the particle size of the finer particles reporting to the overflow of the preceding separator and each of which separators has a diameter which decreases from cyclone separator to cyclone separator in the direction of flow in the series and which enhances the quantity of coarser particles in the range of sizes reporting to the underflow of the separators.

The efficiency $E_i$ of a stage is considered to be the ratio of the actual weight of particles of size $\phi_i$ reporting to the overflow of stage i cyclone with respect to the theoretical weight which should report in ideal conditions at the desired maximum specific gravity admitted to the clean product.

For cyclone stages 1 to $N-1$, the efficiency should be at least 0.9 whereas for last stage N it should be not greater than 0.05.

$E_i$ is a function of the diameter of the cylindrical part of the cyclone separator so that this diameter $D_i$ is an important parameter in optimizing the method and apparatus of the present invention.

In fact for cyclone stage 1 to $N-1$, the diameter $D_i$ is given by the equation $$[D_i]_{i=1}^{i=N-1} \geq \sqrt{2.79 \cdot \phi_i \cdot \frac{\sqrt{\tan(90-2\alpha_i)}}{\cos \alpha_i}}$$

where $D_i$ is in inches and $\phi_i$ is in microns.
For the last stage $D_N$ where $i=N$ we have $$D_N \leq \sqrt{0.6293 \cdot \phi_N \cdot \frac{\sqrt{\tan(90-2\alpha_N)}}{\cos \alpha_N}}$$

The underflow at stage i cyclones is composed of wanted, clean, washed products of the desired S.G. and of a size equal to or greater than Si together with unwanted ashy products of a size equal to or less than $S_i$.

$S_i$ may be considered to be the cut size to be made by a screen placed below the underflow of stage i cyclone.

$$S_i = \phi_i \cdot \sqrt{R}$$

It will be noted that with N=5; R=2. M=1000 $\mu$ and m=30 $\mu$. The following values for $S_i$ are given

| underflow of stage | cut size of screen ($\mu$) |
|---|---|
| 1 | 990 $\mu$ |
| 2 | 495 $\mu$ |
| 3 | 247 $\mu$ |
| 4 | 123.7 $\mu$ |
| 5 | 61.9 $\mu$ |

It is desirable that the input velocity of the material slurry should be substantially the same at each stage and should be between 1.4 to 1.75 m/sec.

It is also to be preferred that the diameter of the underflow outlet should progressively decrease from one separator to the next in the series. The diameter of the underflow of a separator stage can be varied to adjust the performance of a stage to provide a degree of fine tuning.

The invention provides an apparatus designed to "cut" or separate at a predetermined S.G., between 1.5 and 2.5, an assembly or collection of particles inferior to 1 mm in size, using a plurality of cyclones connected in series by the overflow and feeding adequately chosen screening arrangements by the underflow.

Such apparatus is operable to wash particles of a size between M and m microns where M is not greater than 1 mm by cutting or separating at $d_M$ (maximum S.G. admitted in the clean product). For a given $d_m$ the ratio $$\text{ratio } R = \frac{\text{maximum size}}{\text{minimum size}}$$

washed by any cyclone of the series varies with the washability of the raw material. For a given application R has a determined value comprised between 1 and 5.

One embodiment of the invention will now be described by way of example, reference being made to the accompanying drawings.

BEST MODE FOR CARRYING OUT THE INVENTION

The example to be described is concerned with the recovery of coal particles of a size of 1 mm or less from raw material which is usually avail in bulk as slag heaps, tips or ponds adjacent worked-out coal mines. Commonly such reserves will contain between 20 and 80% by weight of coal of a particle size of 1 mm or less was not previously believed to be economically viable to retrieve.

In order to avoid the expense of transporting the raw material, it is intended that the coal particles should be separated at the site of the reserve. The apparatus of the present invention can therefore be custom built on site to suit the characteristics of any particular raw material. The raw material to be treated is therefore initially examined to obtain a measure of the quantity of coal particles in given size ranges and their distribution within the raw material. The apparatus is then designed and assembled.

Figure 1:
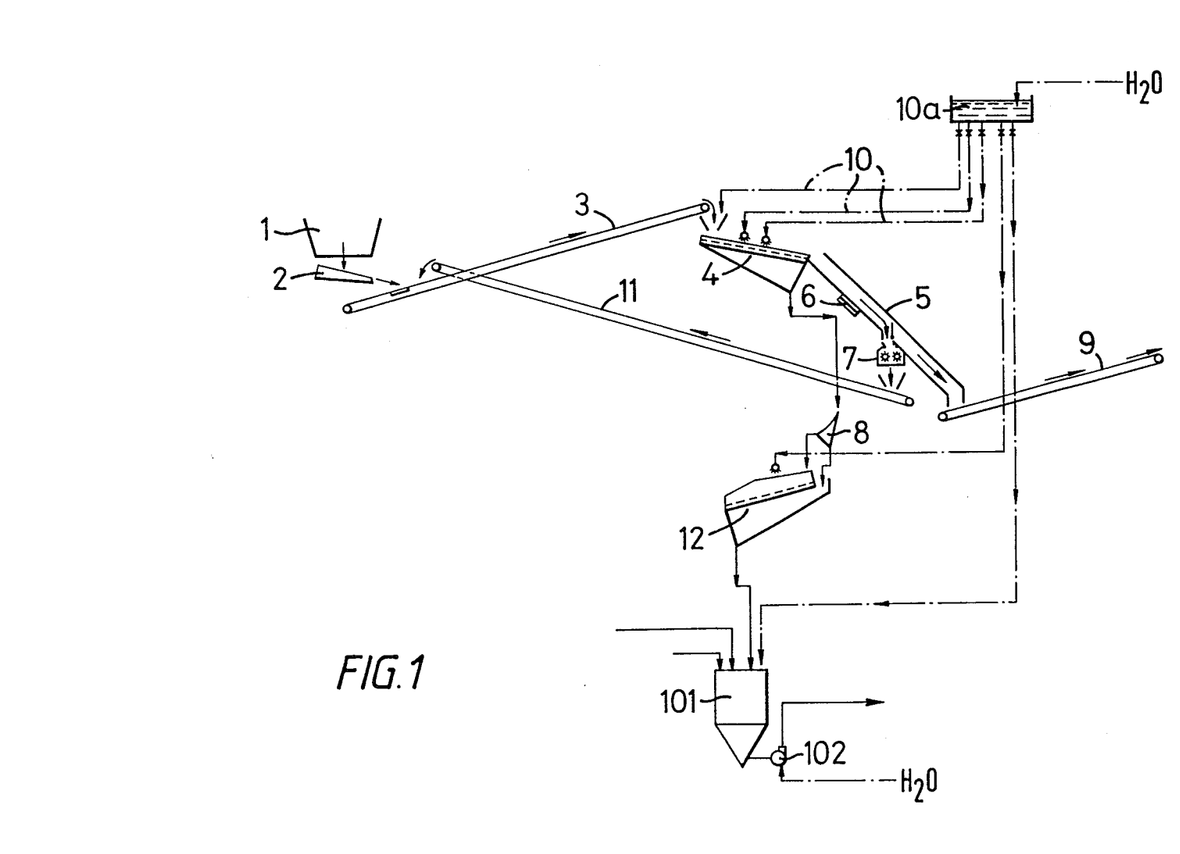
FIG. 1 is a flow diagram of a typical arrangement for recovering larger sized coal.

As illustrated in FIG. 1, the raw material is delivered to a feed trough 1 from which it passes to a distributor 2 which delivers it to a further conveyor 3 which conveys it to a vibrating screen 4. Water is sprayed on to the material on the screen 4 and is supplied along pipes 10 from a tank 10a. The large sized material of the order of 25 mm to 120 mm passes down a spout 5 to a conveyor 9 which conveys this material to a dump. A permanent magnet 6 is associated with the spout 5 to remove any iron that may be present. Smaller sized pieces are diverted through a crusher and sizer 7 to a conveyor 11 for recycling to the conveyor 3.

Figure 2A:
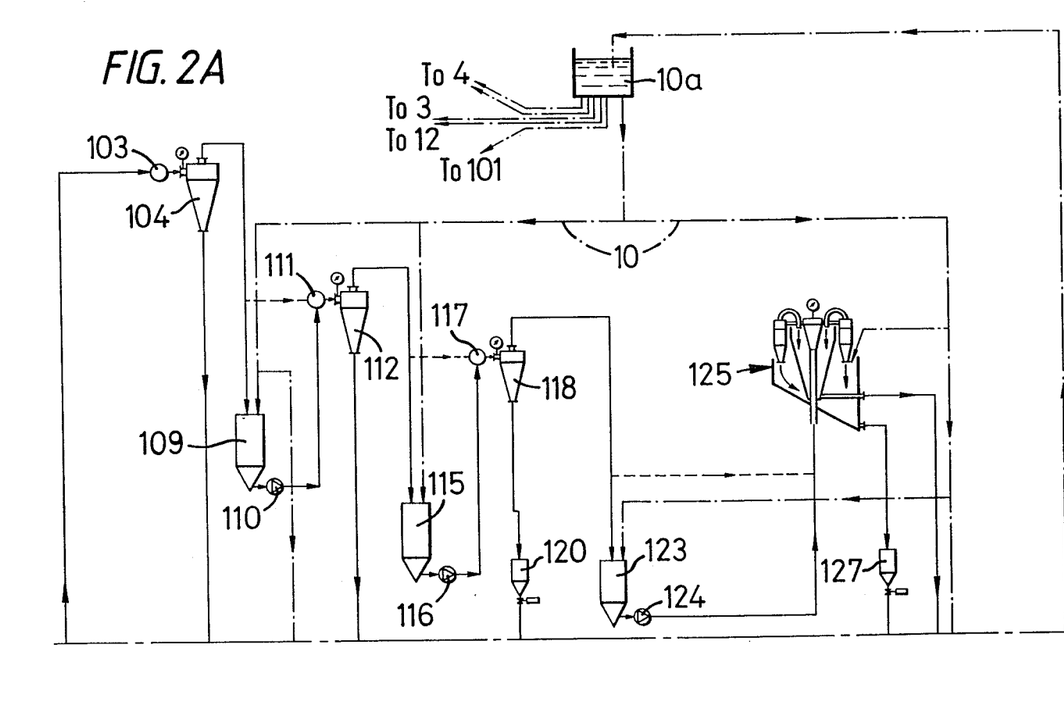
FIGS. 2A and 2B together represent a flow diagram of an arrangement according to the present invention for recovering coal particles of 1 mm and less in size.
Figure 2B:
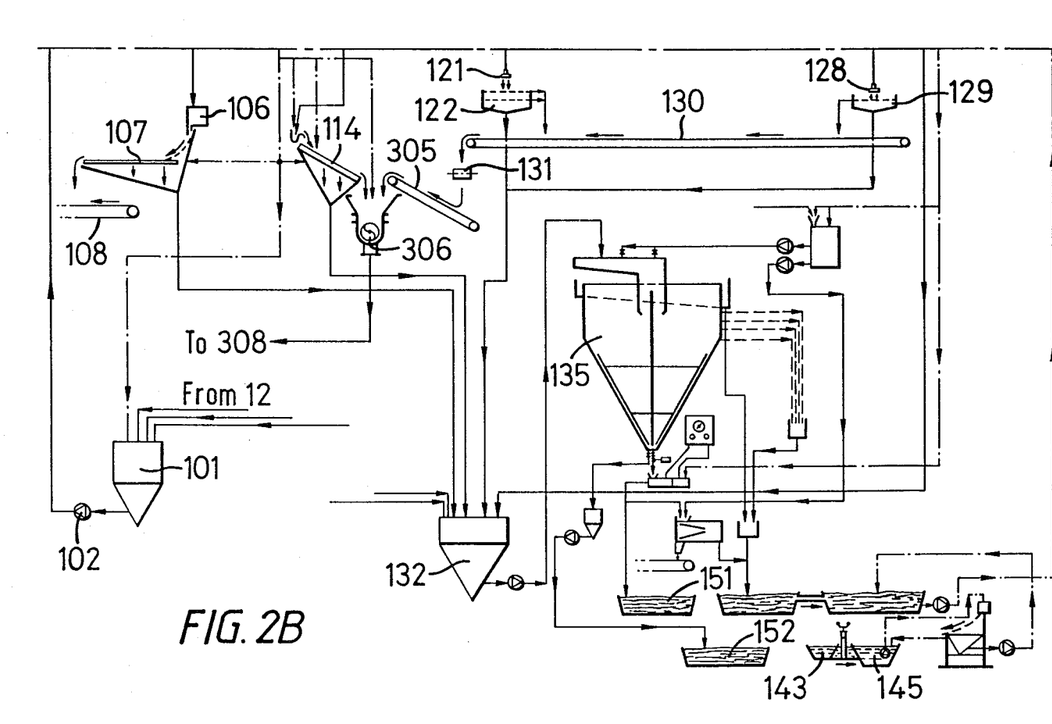

The material passing through the vibrating screen 4 is passed to a sieve bend 8 which separates the particles into larger and smaller sizes such that the smaller sizes of about 1 mm and less are passed to a desliming sump 101 (FIGS. 1 and 2B). The larger sizes are passed over a desliming screen 12 which allows smaller sizes which are trapped to escape to the desliming sump 101. The larger sizes travel on from the screen 12 to a dense medium cyclone washer which separates coal from the clay and other undesirable impurities present. Such coal would generally be greater than 1 mm in size and usually about 1 to 25 mm.

The desliming sump 101 represents the source from which coal particles of a size 1 mm and less are to be recovered. The slurry in sump 101 is pumped by pump 102 (FIG. 2) through manifold 103 to the inlet of cyclone separator 104 which is the first of a series of four stages of cyclone separators in this example represented by separators 104, 112, 118 and a multicyclone ring of separators 125. The material entrained in water is fed to each of the separators 104, 112, 118 and 125 at the same velocity.

The cyclone separator 104 is intended to wash through the overflow washed, clean coal particles of a size of 250 $\mu$ to 500 $\mu$ of the desired S.G. together with unwashed particles of lesser size. It has a cyclone angle of 31° and a cyclone diameter of 30 ins.

It is intended to remove by the underflow particles of a size of 0.5 to 1 mm which are unwashed and are passed to the dense medium cyclone washer previously referred to and which receives the larger sizes from the screen 12.

The particles size of 0.5 to 1 mm could have been washed in an additional cyclone separator preceding the separator 104 and having a diameter of 35 ins and a cyclone angle of 38°. This would bring the number of cyclone separators to five in conformity with equation 4.

The cyclone separator 112 is intended to wash through the overflow washed, clean coal particles of a size of 125 $\mu$ to 250 $\mu$. It has a cyclone angle of 21° and a diameter of 25 ins. The washed, clean particles in the range of 250 $\mu$ to 500 $\mu$ from the previous stage 104 report to the underflow for recovery.

The cyclone separator 118 is intended to wash through the overflow washed, clean coal particles of a size of 65 $\mu$ to 125 $\mu$. It has a cyclone angle of 10° and a diameter of 20 ins.

The washed, clean particles in the range of 125 $\mu$ to 250 $\mu$ from the previous stage 112 exit through the underflow for recovery.

The cyclone separators 125 are intended to remove by the underflow coal particles of a size of 65 $\mu$ and coarser. They have a cyclone angle of 3° and a diameter of 9 ins.

The first cyclone separator 104 is effective to remove from the slurry the finer coal particles roughly of the size of 0 to 0.5 mm and cause these to exit through the overflow to the sump 109 from which this finer slurry is pumped by pump 110 to manifold inlet 111 to the second cyclone separator 112.

Figure 4:
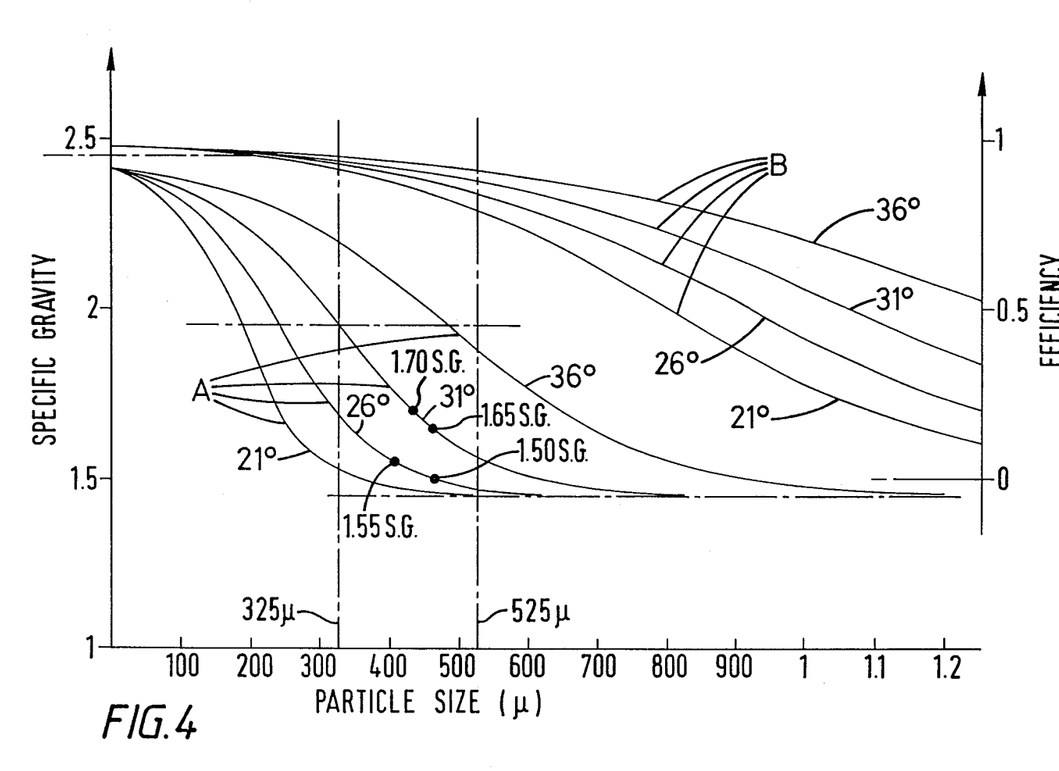
FIG. 4 is a graph which is illustrative of the principle of the invention.

FIG. 4 shows some characteristic curves A for different cyclone angles of plots of density to particle size reporting to the overflow. It will be seen that the cyclone angle of 31° offers a reasonable compromise in order to exit at the overflow the majority of particles of a size less than 500 $\mu$ with particles of the specific gravity concerned in the size range of 250 to 500 $\mu$ (geometric mean 350 $\mu$) in the washed condition. On the same graph can be seen curves B representing efficiency relative to particle size reporting at the overflow. It can be seen that this efficiency falls away for particle sizes of 500 $\mu$ and upwards and that the curve B for the cyclone angle of 31° again offers the best compromise for encouraging the particles of a size greater than 500 $\mu$ not to report to the overflow but rather to the underflow.

As previously mentioned, the larger particles of size 500 $\mu$ to 1 mm exit from the underflow 104 as unwashed coal and pass over a sieve bend 106 followed by a vibrating screen 107 to a conveyor 108 and are conveyed in this example to the dense medium washer previously referred to. The unwanted clay and slurry is taken from the screen 107 to an additional hydrocyclone preceding the separator 104 as previously mentioned so that the latter would be fed with washed, clean coal in this size range.

Figure 3:
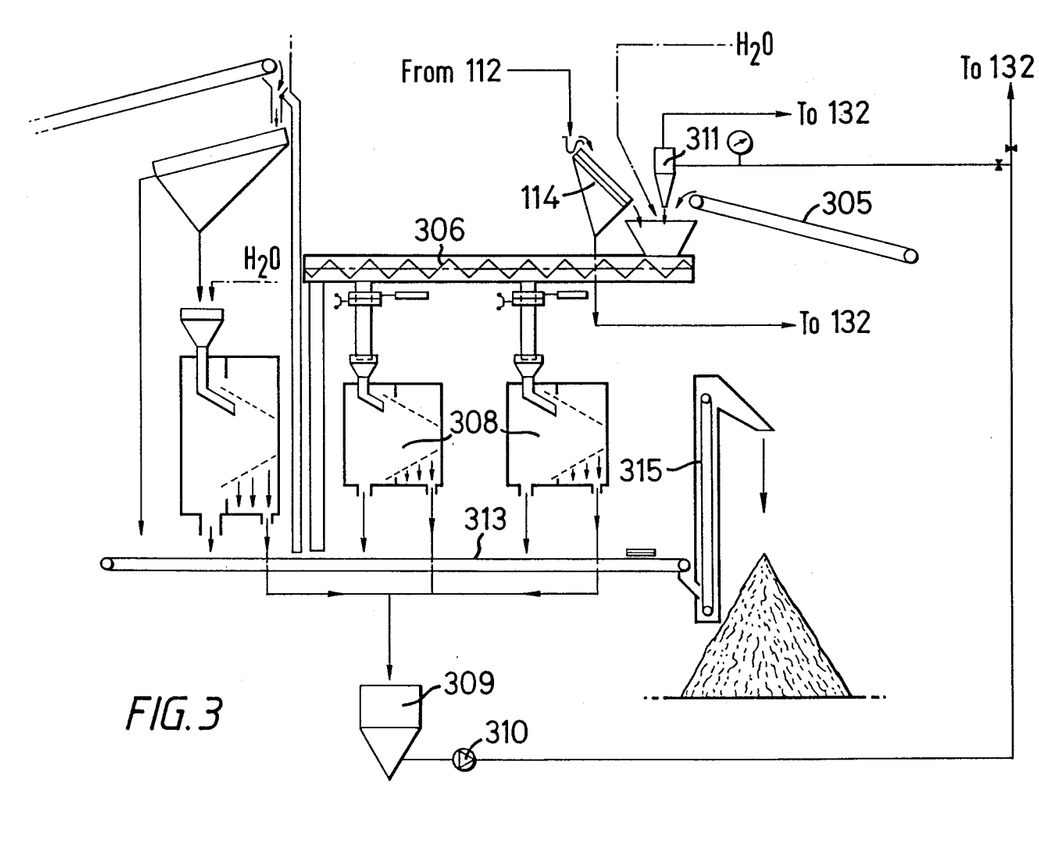
FIG. 3 is a continuation of FIGS. 2A and 2B.

The succeeding cyclone separator stages preform similar operations, the particle size being separated reducing with each separator. Thus cyclone separator 112 sends washed coal particles of a size of 250-500 $\mu$ from its underflow to the vibrating screen 114 and then through screw conveyor 306 to centrifuges 308 which dry out the material. The unwanted clay and slurry is passed from the screen 114 to the tank 132.

The balance of the material exits from the overflow of the separator 112 and comprises washed, clean coal particles in the range of 125-250 $\mu$ and unwashed particles of lesser size. This material passes through sump 115 and pump 116 to the manifold inlet 117 of the next cyclone separator 118. Here, washed coal particles of a size in the range 125 $\mu$ to 250 $\mu$ exit through the underflow through a tank 120 and a feeder 121 to a centrifugal screener 122 from which they are supplied to a conveyor 130. The unwanted clay and slurry is fed from the centrifugal screener 122 to the tank 132.

The overflow from the separator 118 passes through sump 123 and pump 124 to the multicyclones 125. Washed coal particles of a size in the range of 65 $\mu$ to 125 $\mu$ exit from the underflows through tank 127 and feeder 128 to a centrifugal screener 129 whence they are supplied to the conveyor 130. The conveyor 130 advances the particles of size 65 $\mu$ to 250 $\mu$ through conveyors 131 and 305 to the screw conveyor 306 and hence to centrifuges 308 which dry out the material. The dried material from the centrifuges passes along conveyor 313 to elevator 315 for collection. The unwanted water or slurry is collected in tank 309 and pumped by pump 310 either directly to tank 132 or to a further cyclone separator 311 which gives a final separation, the separated coal particles going through the underflow to the screw conveyor 306 and the waste slurry going to the tank 132.

It will be appreciated that although ranges of particle size are referred to, it is inevitable that there is an overlap in practice in the particle sizes extracted at each separator. Nevertheless, by utilizing a plurality of cyclone separators in series and by constructing these selectively to discard reducing bands of particle sizes, it is now possible economically to extract coal particles of 1 mm and less from waste tips and R.O.M. In consequence, the volume of waste is materially reduced and unsightly slag heaps, tips and ponds can be replaced by landscaping to improve the environment.

The waste slurry from the tank 132 is disposed of by dewatering in precipitator 135 and pumping to an aqueous resting place such as a pond or lake (145, 151, 152) or even a river 143.

It will be appreciated that although a specific description is concerned with the recovery of coal particles, the invention has application to the recovery of other minerals which are to be found in large volumes of presently discarded material. Initially, one needs to ascertain the density and particle size of the mineral to be recovered and how a given cyclone separator responds to these parameters. It is then possible, by varying the cyclone angle, the diameter of the cyclone and preferably also the diameter of the underflow outlet, to modify the cyclone separator characteristics to suit the particular application in view.

The diameters of successive cyclones in the series are related by the formula $$\frac{D_1^2}{D_2^2} = K \cdot \frac{\phi_1}{\phi_2} \cdot \frac{\cos \alpha_2}{\cos \alpha_1} \cdot \frac{\sqrt{\tan(90 - 2\alpha^1)}}{\sqrt{\tan(90 - 2\alpha_2)}}$$

where $K=1$ for all but the last cyclone in the series and $K=4.4335$ for the last cyclone.

I claim:

1. An apparatus for separating and recovering particulate material which comprises a plurality of cyclone separators connected in series, means for supplying the particulate material entrained in a liquid to the inlet of the first separator of the series and means for supplying the overflow from each separator to the inlet of the next separator, the cyclone angle of each cyclone in the series being less than that of its predecessor in the series and conforming to the formula $$\frac{\cot(90 - 2\alpha_1)}{\cot(90 - 2\alpha_2)} = \frac{\phi_1}{\phi_2}$$

where $\alpha_1$ and $\alpha_2$ are the cyclone angles of two successive cyclone separators, $\phi_1$ and $\phi_2$ are the geometric mean particle size of the cut of successive separator stages and $\alpha_2$ is within $\pm 5\%$ of the calculated value.

2. An apparatus according to claim 1 in which the diameter of the separators decreases in the direction of flow.

3. An apparatus according to claim 1 in which the diameters of the successive separators are related by the formula $$\frac{D_1^2}{D_2^2} = K \cdot \frac{\phi_1}{\phi_2} \cdot \frac{\cos \alpha_2}{\cos \alpha_1} \cdot \frac{\sqrt{\tan(90° - 2\alpha^1)}}{\sqrt{\tan(90° - 2\alpha_2)}}$$

where $K=1$ for all cyclones but the last, $K=4.4335$ for the last cyclone.

4. Apparatus according to claim 1 in which the diameter of the underflow outlet in the separators decreases from at least one separator to the next in the direction of flow.

5. Apparatus according to claim 1 in which there are N stages of cyclone separators connected in series and the efficiency of stages 1 to $N-1$ is at least 0.9 and the efficiency of the last stage is not greater than 0.05.

6. An apparatus according to claim 1 in which means is provided for supplying the particulate material entrained in a liquid at the same velocity to each of the separators $\pm 10\%$.

7. An apparatus according to claim 6 in which the means for supplying the particulate material entrained in a liquid is arranged to supply the material entrained in the liquid to the cyclone separators at a velocity of between 1.4 to 1.75 m/sec.

* * * * *